United States Patent
Orui

(10) Patent No.: US 6,565,437 B2
(45) Date of Patent: May 20, 2003

(54) GAME SERVICE PROVISION DEVICE AND METHOD

(75) Inventor: Hiroyasu Orui, Tokyo (JP)

(73) Assignees: Konami Corporation, Tokyo (JP); KCE Tokyo, Inc., Tokyo (JP)

(*) Notice: Subject to any disclaimer, the term of this patent is extended or adjusted under 35 U.S.C. 154(b) by 185 days.

(21) Appl. No.: 09/866,608

(22) Filed: May 30, 2001

(65) Prior Publication Data

US 2001/0049304 A1 Dec. 6, 2001

(30) Foreign Application Priority Data

May 31, 2000 (JP) ........................................ 2000-163567

(51) Int. Cl.$^7$ .............................. A63F 13/10; A63F 9/18
(52) U.S. Cl. ............................ 463/29; 463/10; 273/431
(58) Field of Search ................... 463/9, 10, 29; 273/431

(56) References Cited

U.S. PATENT DOCUMENTS

| | | | | |
|---|---|---|---|---|
| 5,180,309 A | * | 1/1993 | Egnor | 463/9 |
| 6,019,370 A | * | 2/2000 | Morris | 273/431 |
| 6,322,074 B1 | * | 11/2001 | Forrest et al. | 273/272 |

FOREIGN PATENT DOCUMENTS

| | | |
|---|---|---|
| EP | 0 976 429 | 2/2000 |
| EP | 0 976 431 | 2/2000 |
| TW | 424363 | 3/2001 |

* cited by examiner

Primary Examiner—Andrew M. Dolinar
(74) Attorney, Agent, or Firm—Sughrue Mion, PLLC

(57) ABSTRACT

In addition to an optional game service in accordance with a designation made by a player, a compulsory game service not directly related to the designation by the player can be provided. A game service provision device is configured so as to perform the steps of receiving a game service request from a player (S101), transmitting a game service designation request to said player in response to said game service request (S104), receiving a game service designation transmitted from said player in response to said game service designation request for designating at least one of a plurality of game services (S105), transmitting the game service designated by said game service designation to said player as an optional game service (S106), and transmitting to said player a compulsory game service selected from said plurality of game services based on predetermined basic information associated with said player at a predetermined probability instead of said game service designation request when said game service request is received (S106–S108).

13 Claims, 6 Drawing Sheets

FIG.2

START THE CLASS

FIG.3

( CATEGORY SELECTION )

PICK UP A CLASS TO TRY

1. LITERATURE AND HISTORY

2. MATHEMATICS AND SCIENCE

3. SPORTS

4. MISCELLANEOUS

FIG. 4

QUESTION #1

WHO WROTE "THE OLD MAN AND THE SEA" AND "A FAREWELL TO ARMS"?

○ 1. SHAKESPEARE

○ 2. STENDHAL

● 3. ERNEST HEMMINGWAY

○ 4. LEV NIKOLAEVICH TOLSTOI

FIG. 5

CHECK YOURE ANSWER!

QUESTION #1

YOU SELECTED:
        3. ERNEST HEMMINGWAY

CORRECT ANSWER IS:
        3. ERNEST HEMMINGWAY

F I G. 6

SURPRISE TEST

GUESS WHAT ?
A SURPRISE TEST !

0. LITERATURE AND HISTORY

FIG. 7

| USER ID | LITERATURE AND HISTORY | | MATHEMATICS AND SCIENCE | | SPORTS | | MISCELLANEOUS | | POLITICS AND ECONOMICS | |
|---|---|---|---|---|---|---|---|---|---|---|
| | QUESTIONS PROVIDED | CORRECT ANSWERS | QUESTIONS PROVIDED | CORRECT ANSWERS | QUESTIONS PROVIDED | CORRECT ANSWERS | QUESTIONS PROVIDED | CORRECT ANSWERS | QUESTIONS PROVIDED | CORRECT ANSWERS |
| 001 | 0 | 0 | 5 | 2 | 3 | 3 | 0 | 0 | 2 | 0 |
| 002 | 12 | 2 | 8 | 8 | 4 | 3 | 2 | 2 | 4 | 4 |
| 003 | 32 | 21 | 15 | 10 | 8 | 8 | 0 | 0 | 3 | 3 |

GAME SERVICE PROVISION DEVICE AND METHOD

BACKGROUND OF THE INVENTION

1. Field of the Invention

The present invention relates to a device and method for providing game services. The present invention more particularly relates to a game service provision device and method capable of selectively providing an optional game service as designated by a player and a compulsory game service not directly related to a designation made by the player.

2. Description of the Prior Art

Quiz game devices using a computer system successively present question images to a player, determine whether an answer to each question input by the player with use of operation keys is correct or not, shows the determination to the player, and evaluates the player's result.

Some of these quiz game devices allow players to select the category of a question when, for example, the game is started or the like. In such a quiz game device, when a player designates and inputs the category of a question using operation keys, images of questions in that category are successively presented to the player. The quiz game device of this type makes it possible for a player to enjoy the category they are good at or the category they like.

However, such a quiz game device also has a drawback that it is possible for players to select only the questions in their favorite category. Therefore, if the categories selected by players are excessively concentrated, interesting questions in an unselected category cannot be provided to players.

The above-described problems are not peculiar to the quiz game device allowing selection of a question category, but are generally observed with game service provision devices selecting a game service to be actually provided to a player from a plurality of game services as designated by the player, such as a driving game device allowing selection of a driving course and a fighting game device allowing selection of an enemy character.

SUMMARY OF THE INVENTION

The present invention has been conceived in view of the above-described problems, and an object thereof is to provide a game service provision device and method capable of providing a compulsory game service which is not directly related to a designation made by a player in addition to an optional game service in accordance with the designation by the player.

In order to solve the above-described problems, a game service provision device of the present invention includes means for receiving a game service request from a player, means for transmitting a game service designation request to said player in response to said game service request, means for receiving a game service designation transmitted from said player in response to said game service designation request for designating at least one of a plurality of game services, means for transmitting the game service designated by said game service designation to said player as an optional game service, and means for transmitting to said player a compulsory game service selected from said plurality of game services based on predetermined basic information associated with said player on a predetermined condition instead of said game service designation request when said game service request is received.

A game service provision method of the present invention includes the steps of receiving a game service request from a player, transmitting a game service designation request to said player in response to said game service request, receiving a game service designation transmitted from said player in response to said game service designation request for designating at least one of said plurality of game services, transmitting the game service designated by said game service designation to said player as an optional game service, transmitting a compulsory game service selected from said plurality of game services based on predetermined basic information associated with said player on a predetermined condition instead of said game service designation request when said game service request is received.

According to the present invention, when a game service request is received from a player, a game service designation request is transmitted in response to the game service request. In response to such a designation request, a game service designation transmitted from the player is received. The game service designation designates at least one of a plurality of game services. The game service designated by this game service designation is transmitted to the player as an optional game service. On the other hand, according to the present invention, a compulsory game service is returned to the player at a predetermined probability instead of the game service designation request when a game service request is received from the player. Thus, a compulsory game service is provided to the player instead of requesting a game service designation. The compulsory game service is selected from a plurality of game services based on predetermined basic information associated with the player. The predetermined basic information can be produced, for example, based on the content of communication heretofore exchanged with each player. In this manner, a compulsory game service not directly related to a designation made by a player can be provided to the player in addition to an optional game service provided in accordance with the designation by the player, enhancing excitement of the game service provided by the game service provision device.

According to one aspect of the present invention, the present device further includes means for storing provision amount information indicating, for each game service, an amount of the game service provided to said player as at least part of said predetermined basic information, and means for selecting said compulsory game service from said plurality of game services based on said provision amount information. The provision amount information indicates, for example, the time period for which the game service is provided, the number of times the game service is provided, or the number of elements provided to the player when the game service is composed of respective service elements (such as respective questions in the quiz game service). According to the present invention, a compulsory game service can be selected in accordance with the amount of the game service has been provided to a player, so that a game process, such as selecting a game service which has been provided to the player only in a small amount as a compulsory game service, can be achieved.

According to another aspect of the present invention, the present device further includes means for storing result information indicating, for each game service, a result of the game service provided to said player as at least part of said predetermined basic information, and means for selecting said compulsory game service from said plurality of game services based on said result information. Thus, a compulsory game service can be selected for each player in accordance with the result of the game service, and therefore a game process, such as selecting a game service in which the player has not been played well as a compulsory game service, can be achieved.

A game service provision device according to the present invention is a game service provision device for selectively providing each of a plurality of players with an optional game service or a compulsory game service, comprising an optional game service selection means for acquiring a game service designation from said player and selecting a game service corresponding to said game service designation from a plurality of game services as said optional game service, basic information storage means for storing predetermined basic information in association with each of said plurality of players, and compulsory game service selection means for selecting said compulsory game service to be provided to each of said plurality of players from said plurality of game services based on said predetermined basic information.

Further, a game service provision method according to the present invention is a game service provision method for selectively providing a player with an optional game service or a compulsory game service, comprising acquiring a game service designation from said player and selecting a game service corresponding to said game service designation from a plurality of game services as said optional game service, storing and renewing basic information in association with said player, and selecting said compulsory game service to be provided to said player from said plurality of game services based on said basic information.

According to the present invention, an optional game service or a compulsory game service is selectively provided to each player. The optional game service is one of a plurality of game services that corresponds to a game service designation acquired from a player. On the other hand, the compulsory game service is a game service selected based on predetermined basic information associated with each player. Thus, the compulsory game service not directly related to a designation made by a player can be provided in addition to the optional game service in accordance with the designation by the player, enhancing excitement of the game service provided by the game service provision device.

According to still another aspect of the present invention, said optional game service or compulsory game service is selected so that said compulsory game service is provided at a smaller probability than said optional game service. As a result, the compulsory game service can be unexpectedly provided to players, further enhancing excitement and amusement of the game.

According to a further aspect of the present invention, said predetermined basic information is produced based on the content of communication heretofore exchanged with each of said plurality of players. Consequently, a compulsory game service based on the content of the past communication with each player can be provided to the player.

For example, said basic information storage means may store designated game service information identifying the game service already designated as said optional game service by each player in association with each of said plurality of players as at least part of said predetermined basic information, and said compulsory game service selection means may select, for each of said plurality of players, a game service not yet designated by the player as said compulsory game service to be provided to the player from said plurality of game services based on said designated service information associated with the player. As a result, the game service not yet designated by the player can be compulsorily provided to the player.

Further, for example, said basic information storage means may store provided game service information identifying, for each player, the game service already provided to the player as said optional or compulsory game service in association with each of said plurality of players as at least part of said predetermined basic information, and said compulsory game service selection means may select, for each of said plurality of players, a game service not yet provided to the player as said compulsory game service to be provided to the player from said plurality of services based on said provided game service information associated with the player. As a result, the game service not yet provided to the player can be compulsorily provided to the player.

Further, for example, said basic information storage means may store designation times information indicating, for each game service, the number of times each player has designated the game service as said optional game service in association with each of said plurality of players as at least part of said predetermined basic information, and said compulsory game service selection means may select said compulsory game service to be provided to each of said plurality of players from said plurality of game services based on said designation times information associated with the player. Thus, the compulsory game service based on the past designation times can be provided to the player. As a result, the game service which, for example, has been designated less frequently can be provided to the player as a compulsory game service.

Further, for example, said basic information storage means may store provision amount information indicating, for each game service, an amount of the game service which has been provided to each player as said optional or compulsory game service in association with each of said plurality of players as at least part of said predetermined basic information, and said compulsory game service selection means may select said compulsory game service to be provided to each of said plurality of players from said plurality of game services based on said provision amount information associated with the player. The provision amount information indicates, for example, the time period for which the game service is provided, the number of times the game service is provided, or the number of elements provided to the player when a game service is composed of respective service elements (such as respective questions in the quiz game service). Consequently, the compulsory game service can be selected in accordance with the amount of the game service provided to the player, so that a game process, such as selecting a game service which has been provided to the player only in a small amount as the compulsory game service, can be achieved.

Alternatively, for example, said basic information storage means may store result information of the game service already provided to each player as said optional or compulsory game service in association with each of said plurality of players as at least part of said predetermined basic information, and said compulsory game service selection means may select said compulsory game service to be provided to each of said plurality of players from said plurality of game services based on said result information associated with the player. As a result, the compulsory game service can be selected in accordance with each player's result of the game service, so that a game process, such as selecting a game service in which the player has not been playing well as a compulsory game service, can be achieved.

BRIEF DESCRIPTION OF THE DRAWINGS

FIG. 2 illustrates an example of a start screen of a quiz game.

FIG. 3 illustrates an example of a category selection screen (a screen to start an optional game service) of the quiz game.

FIG. 4 illustrates an example of a question screen of the quiz game.

FIG. 5 illustrates an example of an answer checking screen of the quiz game.

FIG. 6 illustrates an example of a surprise test starting screen (a screen to start a compulsory game service) of the quiz game.

FIG. 7 illustrates the contents stored in the game database.

DESCRIPTION OF THE PREFERED EMBODIMENTS

The entire disclosure of the corresponding Japanese application 2000-163567 filed on May 31, 2000 including specification, claims, drawings and summary are incorporated by reference herein.

Preferred embodiments of the present invention will now be described in detail with reference to the drawings.

Figure 1:
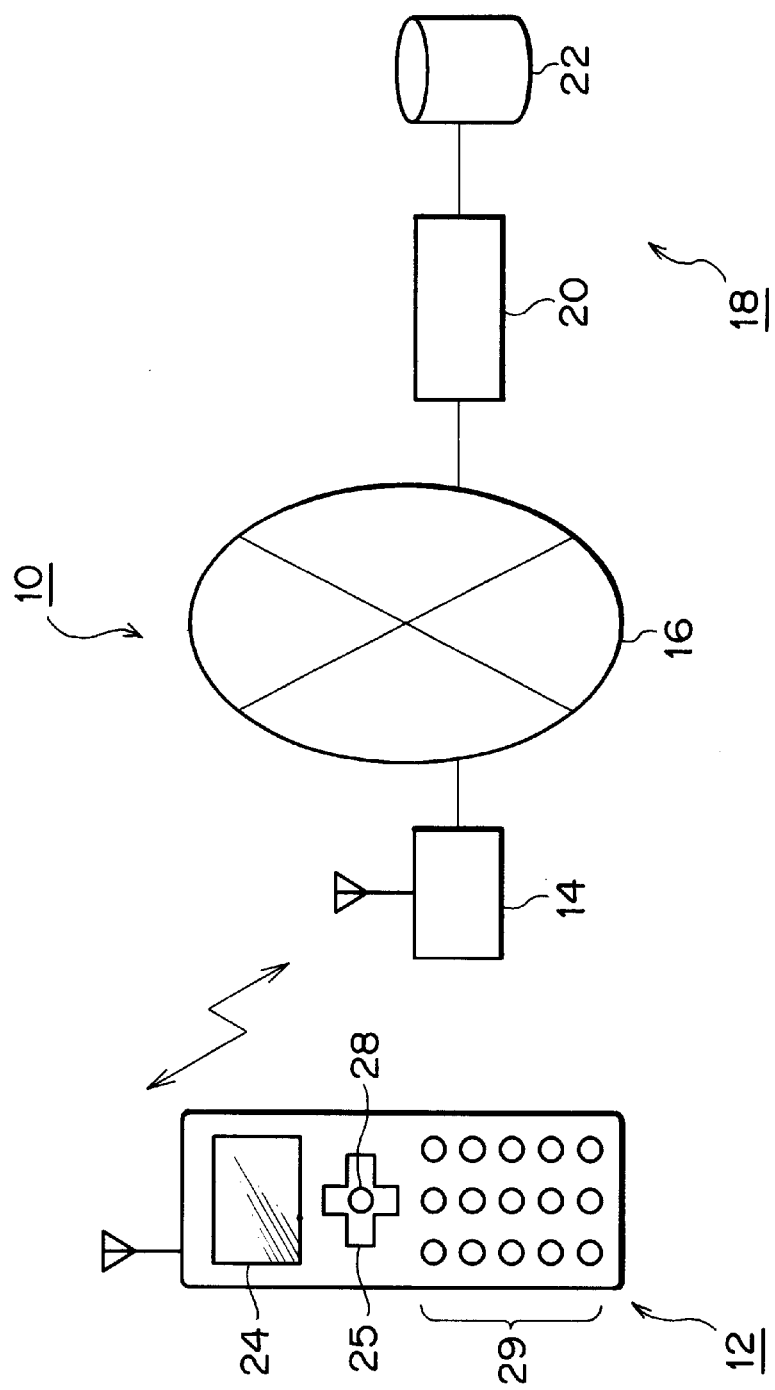
FIG. 1 illustrates an overall configuration of a network game system including a game service provision device according to an embodiment of the present invention.

FIG. 1 shows an overall configuration of a network game system including a game service provision device according to an embodiment of the present invention. A network game system 10 shown in FIG. 1 includes a mobile phone 12, a mobile phone base station 14, a communication network 16, and a game service provision device 18. The game service provision device 18 includes a game server 20 and a game database (DB) 22.

The mobile phone 12 includes a display 24 formed by an LCD or the like, a direction button 26, a function button 28, and a group of circular buttons 29. The mobile phone 12 is of a conventionally well-known type. The group of circular buttons 29 allows for dialing numbers, and a telephone book and various set menus are shown on the display 24. The various menus are set by using the direction button 26 and the function button 28.

The mobile phone 12 is especially provided with a function of connecting to the communication network 16, such as Internet, through the mobile phone base station 14. This network connecting function of the mobile phone 12 is utilized in the present embodiment. More specifically, a user of the mobile phone 12 transmits a URL (uniform resource locator) to the communication network 16 using the direction button 26, the function button 28, and the group of circular buttons 29, and obtains hypertext (game service) corresponding to the URL from the game server 20. In the game server 20, the URL transmitted from the mobile phone 12 is recognized as a game command, and hypertext corresponding to the game command is produced and sent back to the mobile phone 12 through the communication network 16 and the mobile phone base station 14. Upon receiving the hypertext, the mobile phone 12 presents a game screen on the display 24 based on the received hypertext.

In relaying the URL transmitted in a wireless manner from the mobile phone 12 to the communication network 16, the mobile phone base station 14 adds a user ID assigned to the mobile phone 12 to the URL, so that the sender of the URL, i.e. game command, can be identified in the game server 20. The game server 20 is a server computer which is connected to the communication network 16, and to which the game DB 22 is connected. The game server 20 refers to the content stored in the game DB 22 when it produces the hypertext, i.e. game service, based on the URL, i.e. game command.

Next, a technique of providing a quiz game service to a user of the mobile phone 12 (player) by using the network game system 10 having the above-described configuration will be described as an embodiment of the present invention. In this quiz game service, a player plays a role of a student at an imaginary school set up in a game space, and successively solves questions in a variety of categories. The student earns a credit by solving a certain number of quizzes in each category, analogous to classes at school. Players successively take these classes, and feel as if they were having a school life. The quiz game services include an optional quiz game service and a compulsory quiz game service. The optional quiz game service is like an ordinary class, and a player is provided with a quiz in the category they have selected. On the other hand, the compulsory quiz game service is like a "surprise" (unexpected) test. In this service, a player cannot directly designate the category of the quiz, but the game server 20 selects the category based on basic information stored in the game DB 22, and the quiz in the selected category is provided to the player. Next, game screens presented on the display of the mobile phone 12 according to this quiz game service will be discussed. The game screens described below are all obtained by synthesizing the hypertext described in HTML (hypertext markup language) at the mobile phone 12.

FIG. 2 illustrates a start screen of the quiz game service. As shown, in this quiz game service, a player earns a credit by solving a certain number of questions in each category, just like the classes at school, and a butt onto "Start the class" is included in the start screen, which is presented on the display 24 of the mobile phone 12. When a player selects the button to "Start the class" using the direction button 26 and the function button 28, a URL representing a game service request is transmitted to the game server 20.

FIG. 3 shows a screen for selecting the category. This category selection screen is a game screen usually displayed on the display 24 of the mobile phone 12 when a player selects the button to "Start the class". This screen is arranged as an entrance to the optional quiz game service, includes a plurality of buttons corresponding to respective question categories, and requests the player to designate a question category (game service designation request). When the player selects one of these buttons on the screen using the direction button 26 and the function button 28, a URL for requesting a game service in the category represented by the button (game service designation) is returned to the game server 20. In this quiz game service, categories of "Literature and History", "Mathematics and Science", "Sports", "Miscellaneous", "Politics and Economics", and the like are arranged, and among the above categories, categories of "Literature and History", "Mathematics and Science", "Sports", and "Miscellaneous" are presented to players on this category selection screen as quiz category options.

FIG. 4 shows a question screen. This screen is also presented on the display 24 of the mobile phone 12, and the players are provided with a quiz game service presented on a screen whose configuration is similar in the optional quiz game service and the compulsory quiz game service. The question screen illustrated in FIG. 4 includes a plurality of questions (not shown). In the display area for each question, a question number, a question, and answer options are presented from the top thereof. Each of the answer options is associated with a radio button. The player selects one of the radio buttons for each question and finally selects an unillustrated "Answer" button, whereby a URL representing the answer to each question is transmitted to the game server 20. The contents of the questions are prestored in the game DB 22 as quiz data.

FIG. 5 shows an answer checking screen. This screen is also presented on the display 24 of the mobile phone 12, and the player is informed of a correct answer of the quiz presented on the screen whose configuration is similar in the optional quiz game service and the compulsory quiz game service. This screen is presented on the display 24 of the mobile phone 12 as a response to the player's selection of the "Answer" button (not shown) on the question screen shown in FIG. 4, and indicates the option selected by the player and the correct option for each question.

FIG. 6 shows a screen to start a "surprise" test, which is an entrance to the compulsory quiz game service in which players can select no other categories other than the "Literature and History" category. This surprise test starting screen is returned in response to the game service request from the player in place of the category selection screen at a predetermined probability. When the player selects the button for "Literature and History" on the screen, a URL for designating the question category is transmitted to the game server 20. Receiving this URL, the game server 20 returns to the mobile phone 12 a question screen including a quiz in the selected category and having a similar configuration to the question screen shown in FIG. 4. When the player answers to the quiz on the question screen, an answer checking screen for the quiz in that category having a similar configuration to the answer checking screen shown in FIG. 5 is then returned to the mobile phone 12.

In the above-described quiz game service, the category of the question provided to the player as the compulsory quiz game service is determined by the game server 20 referring to the game DB 22. FIG. 7 shows a table stored in the game DB 22. As shown, the table includes the number of questions provided and the number of correct answers for each of the question categories recorded therein in association with each user ID. FIG. 7 indicates that, for example, a user with the user ID "002" is provided with four questions from the category of "Sports" and answers correctly to three of the four questions. This table is renewed when the game server 20 provides a player with a quiz, and when the player has given an answer. More specifically, when transmitting a question screen to the player, the game server 20 checks the question category and the number of questions provided, and adds the number of questions provided for this session to the number in the column of "Questions Provided" for that category in association with the player, i.e. destination of that question screen. Upon receiving a URL representing answers to the questions from the player, the game server 20 determines the number of correct answers based on the quiz data stored in the quiz DB 22, and adds that number to the number in the column of "Correct Answers" for that category in association with the player.

Figure 8:
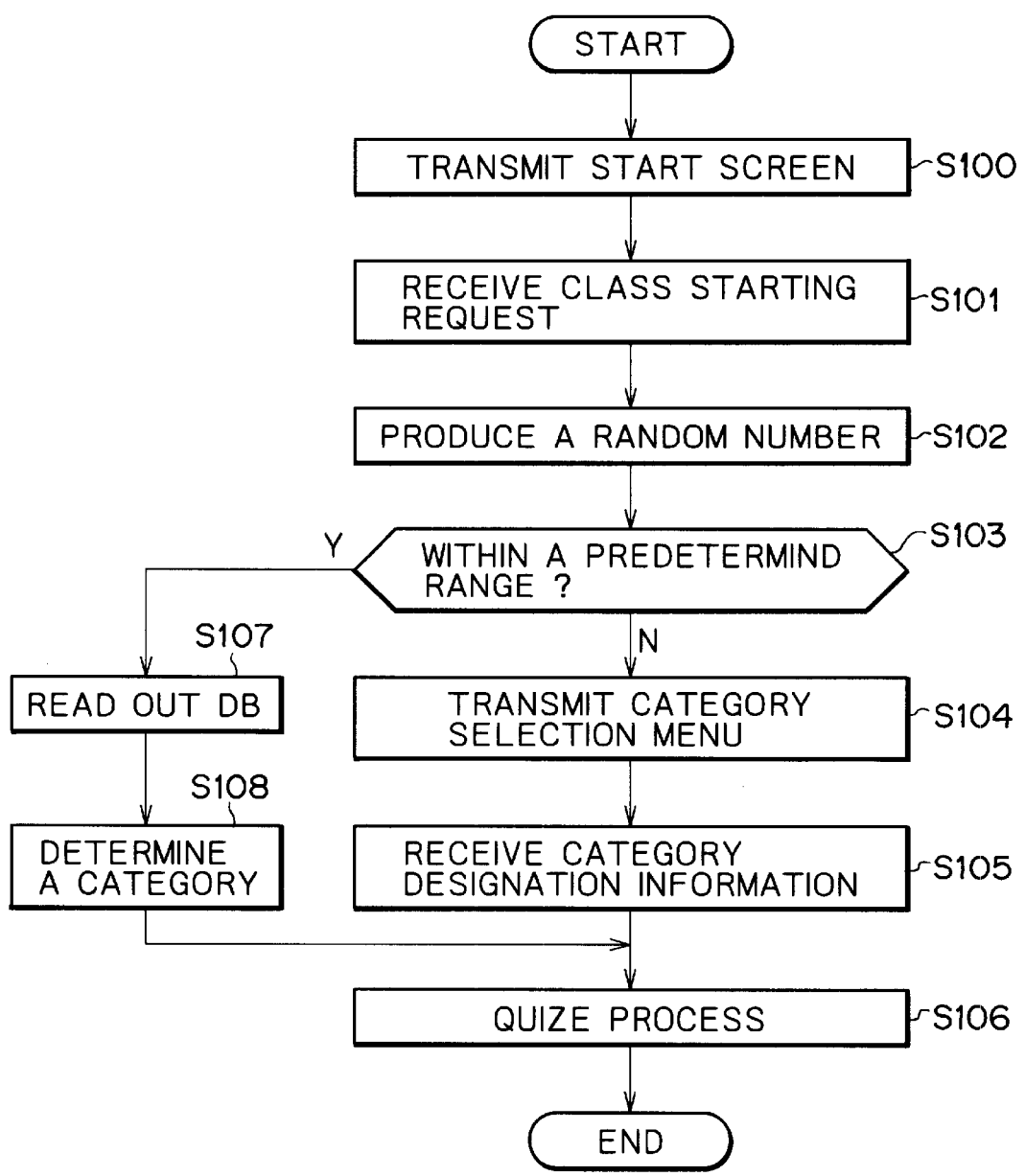
FIG. 8 is a flow chart for the game process performed by the game server 20.

Next, a game process performed by the game server 20 will be explained. FIG. 8 is a flowchart for describing the game process performed by the game server 20. As illustrated in FIG. 8, the game server 20 first transmits a start screen to a player (mobile phone 12) (S100). This start screen is transmitted in the form of hypertexts in response to a request (URL) from the player. When the button to "Start the class" is selected on the start screen, the game server 20 receives a URL representing a request to start the class (S101). The game server 20 then produces a random number no smaller than 0 and no greater than 255, for example, according to a well-known algorithm (S102). A determination is then made as to whether or not the produced random number is within a predetermined range, say, in the range of 0 to 50 (S103). When the random number is within the range of 1 to 50, a compulsory quiz game service is provided to the player. On the other hand, when the random number is 51 or greater, an optional quiz game service is provided to the player. In other words, the compulsory quiz game service is provided to players at the probability of approximately 20%, and therefore the optional quiz game service is provided to players at the probability of approximately 80%. By thus providing players with the compulsory quiz game service at a smaller probability than the optional quiz game service, players can receive the compulsory quiz service with a feeling of surprise, so that the quiz game service can offer even greater excitement to the players.

If it is determined at the step S103 that the random number is not in the predetermined range, a hypertext for presenting a category selection screen serving as a screen to start the optional quiz game service is transmitted to the player (S104). After the player selects the question category on the category selection screen, a URL for designating that category is transmitted to the game server 20. The game server 20 receives this URL (S105). Next, the game server 20 performs a quiz process for the category represented by the received URL (S106). More specifically, the game server 20 reads out a question in the category represented by the URL received at the step S105 from the quiz data stored in the game DB 22, and produces and sends a hypertext including the question to the player (mobile phone 12). The table shown in FIG. 7 is also renewed at this time. Receiving the URL representing an answer to the question as a response, the answer included in the URL is compared with the quiz data stored in the game DB 22 to determine if the answer is correct or not, and the result is transmitted back to the player as the answer checking screen. The table shown in FIG. 7 is renewed again at this time. The player is thus provided with the optional quiz game service.

On the other hand, if it is determined at the step S103 that the random number is with in the predetermined range, the game server 20 acquires a user ID included in the URL for requesting to start the class, and reads out the numbers of questions provided and correct answers for the respective question categories (basic information) associated with the acquired user ID from the table (see FIG. 7) stored in the game DB 22 (S107). The category of the question to be provided to the player associated with that user ID is then determined based on the basic information (S108). More specifically, the number of questions provided is checked for each question category, and the category for which the number of questions provided to the player is the smallest is selected as the question category of the compulsory quiz game service. If there is more than one category for which the number of questions provided to the player is the smallest, a random number may be used to choose one of those categories as the question category for the compulsory quiz game service. Alternatively, among the categories for which the number of questions provided to the player is the smallest, the category for which the number of correct answers is the smallest may be chosen as the question category for the compulsory quiz game service. Further, the category selected by the player on a selection screen out of the categories for which the number of questions provided to the player is the smallest may be chosen as the question category for the compulsory quiz game service. After the question category is thus determined, the game server 20 performs the quiz process for the selected category (S106).

According to the network game system described above, a quiz game service in the question category designated by a player can be provided to the player as an optional quiz game service, and also a quiz game service in the category for which the number of questions provided to the player is the smallest, i.e. the category the player has least frequently selected, can be provided as a compulsory quiz game service at a fixed probability. As a result, the player is provided not only with quizzes in his/her favorite category but also with quizzes in the other categories, enhancing attractiveness of the game.

It should be noted that the present invention is not limited to the above-described embodiment.

For example, while the question category in the compulsory quiz game is mainly determined based on the number of questions provided for each category in the above description, it is also possible to provide the player with the compulsory quiz game service only when there is a category for which no question is provided, and provide the player with a question from that category. Further, the category for which the number of correct answers is the smallest may be chosen as the question category in the compulsory quiz game service, or the category for which a correct answer ratio (the number of correct answers divided by the number of questions provided for each category) is the lowest may be determined as the question category in the compulsory quiz game service. Alternatively, the player may be given a choice of a category for the compulsory quiz game service from those for which the number of correct answers, the number of questions provided, or the correct answer ratio is below a predetermined threshold. The question category in the compulsory quiz game service may be determined using the basic information for each player, or it may also be determined with reference to the basic information of other players. This makes it possible to select, for example, the category generally unpopular among all the players as the question category in the compulsory quiz game service.

While the category designated by a player is provided to him/her as the category of an optional quiz game service in the above embodiment, when a question in the designated category is not provided to the player as the optional quiz game service (that is, the number of times that category is designated is not equal to the number of times questions of that category are provided), the number of times each category is designated may be stored in the table stored in the game DB 22 in association with each user ID, so that such number of designation times may be taken into consideration as, at least part of, the basic information in determining the question category in the compulsory quiz game service.

Further, although the network game system 10 is implemented using the mobile phone 12 in the above description, any other portable information terminals connectable to the communication network 16 through wireless communication may be used in place of the mobile phone 12. Connection to the communication network 16 is not limited to wireless communication, and commonly-used personal computers may be employed to connect to the game server 20. Further, application of the present invention is not limited the the network game system 10. It is also applicable to, for example, common arcade game machines. When a user ID is stored in association with basic information in arcade game machines, in addition to an optional game service, a compulsory game service can be provided based on basic information for each user, making the games even more interesting and exciting.

While the above description relates to an example where the present invention is applied to the game service provision device for providing a player with a quiz game service, it is also applicable to a variety of other game service provision devices, such as a device for providing a driving game service in which players can select a driving course, and a device for providing a fighting game service in which players can select an enemy character to fight with.

What is claimed is:

1. A game service provision device, comprising:
   means for receiving a game service request from a player;
   means for transmitting a game service designation request to said player in response to said game service request;
   means for receiving a game service designation transmitted from said player in response to said game service designation request for designating at least one of a plurality of game services;
   means for transmitting the game service designated by said game service designation to said player as an optional game service; and
   means for transmitting to said player a compulsory game service selected from said plurality of game services based on predetermined basic information associated with said player on a predetermined condition instead of said game service designation request when said game service request is received.

2. The game service provision device according to claim 1, further comprising:
   means for storing provision amount information indicating, for each game service, an amount of the game service provided to said player as at least part of said predetermined basic information; and
   means for selecting said compulsory game service from said plurality of game services based on said provision amount information.

3. The game service provision device according to claim 1, further comprising:
   means for storing result information indicating, for each game service, a result of the game service provided to said player as at least part of said predetermined basic information; and
   means for selecting said compulsory game service from said plurality of game services based on said result information.

4. A game service provision method, comprising the steps of:
   receiving a game service request from a player;
   transmitting a game service designation request to said player in response to said game service request;
   receiving a game service designation transmitted from said player in response to said game service designation request for designating at least one of said plurality of game services;
   transmitting the game service designated by said game service designation to said player as an optional game service; and
   transmitting a compulsory game service selected from said plurality of game services based on predetermined basic information associated with said player on a predetermined condition instead of said game service designation request when said game service request is received.

5. A game service provision device for selectively providing each of a plurality of players with an optional game service or a compulsory game service, comprising:
   an optional game service selection means for acquiring a game service designation from said player and selecting a game service corresponding to said game service designation from a plurality of game services as said optional game service;

basic information storage means for storing predetermined basic information in association with each of said plurality of players; and compulsory game service selection means for selecting said compulsory game service to be provided to each of said plurality of players from said plurality of game services based on said predetermined basic information.

6. The game service provision device according to claim 5, wherein said optional game service or said compulsory game service is selected so that said compulsory game service is provided at a smaller probability than said optional game service.

7. The game service provision device according to claim 5, wherein said predetermined basic information is produced based on the content of communication heretofore exchanged with each of said plurality of players.

8. The game service provision device according to claim 7, wherein said basic information storage means stores designated game service information identifying the game service already designated as said optional game service by each player in association with each of said plurality of players as at least part of said predetermined basic information, and said compulsory game service selection means selects, for each of said plurality of players, a game service not yet designated by the player as said compulsory game service to be provided to the player from said plurality of game services based on said designated game service information associated with the player.

9. The game service provision device according to claim 7, wherein said basic information storage means stores provided game service information identifying, for each player, the game service already provided to the player as said optional or compulsory game service in association with each of said plurality of players as at least part of said predetermined basic information, and said compulsory game service selection means selects, for each of said plurality of players, a game service not yet provided to the player as said compulsory game service to be provided to the player from said plurality of game services based on said provided game service information associated with the player.

10. The game service provision device according to claim 7, wherein said basic information storage means stores designation times information indicating, for each game service, the number of times each player has designated the game service as said optional game service in association with each of said plurality of players as at least part of said predetermined basic information, and said compulsory game service selection means selects said compulsory game service to be provided to each of said plurality of players from said plurality of game services based on said designation times information associated with the player.

11. The game service provision device according to claim 7, wherein said basic information storage means stores provision amount information indicating, for each game service, an amount of the game service which has been provided to each player as said optional or compulsory game service in association with each of said plurality of players as at least part of said predetermined basic information, and said compulsory game service selection means selects said compulsory game service to be provided to each of said plurality of players from said plurality of game services based on said provision amount information associated with the player.

12. The game service provision device according to claim 7, wherein said basic information storage means stores result information of the game service already provided to each player as said optional or compulsory game service in association with each of said plurality of players as at least part of said predetermined basic information, and said compulsory game service selection means selects said compulsory game service to be provided to each of said plurality of players from said plurality of game services based on said result information associated with the player.

13. A game service provision method for selectively providing a player with an optional game service or a compulsory game service, comprising:

acquiring a game service designation from said player and selecting a game service corresponding to said game service designation from a plurality of game services as said optional game service;

storing and renewing basic information in association with said player; and selecting said compulsory game service to be provided to said player from said plurality of game services based on said basic information.

* * * * *